Figure 1:
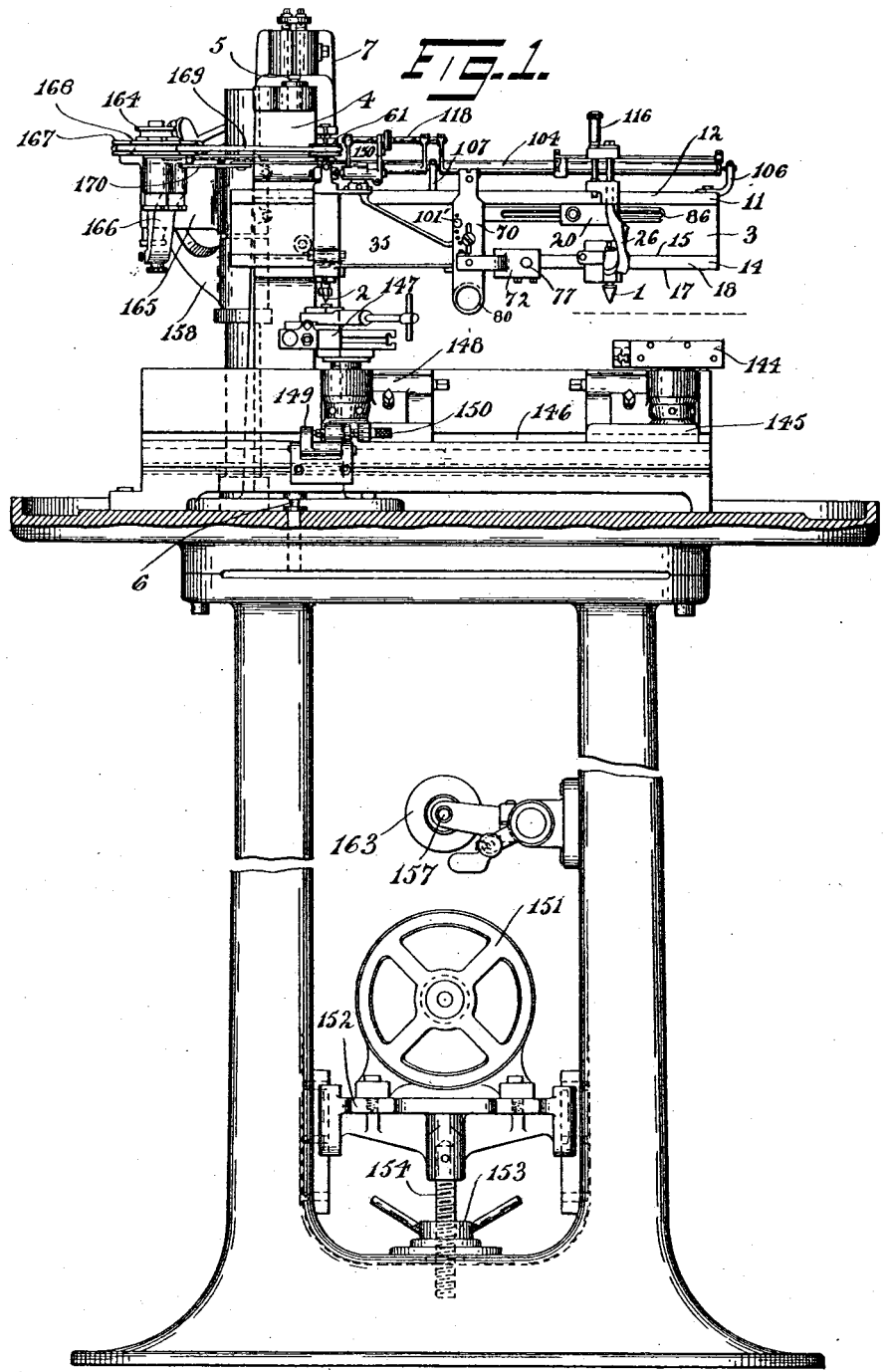

F. H. RICHARDS.
PANTOGRAPHIC MILLING MECHANISM.
APPLICATION FILED FEB. 25, 1910.

1,117,245.

Patented Nov. 17, 1914.
11 SHEETS—SHEET 1.

Witnesses:
S. Newman
H. D. Penney

Inventor:
Francis H. Richards

F. H. RICHARDS.
PANTOGRAPHIC MILLING MECHANISM.
APPLICATION FILED FEB. 25, 1910.

1,117,245.

Patented Nov. 17, 1914.
11 SHEETS—SHEET 2.

Witnesses:
Inventor.
Francis H. Richards.

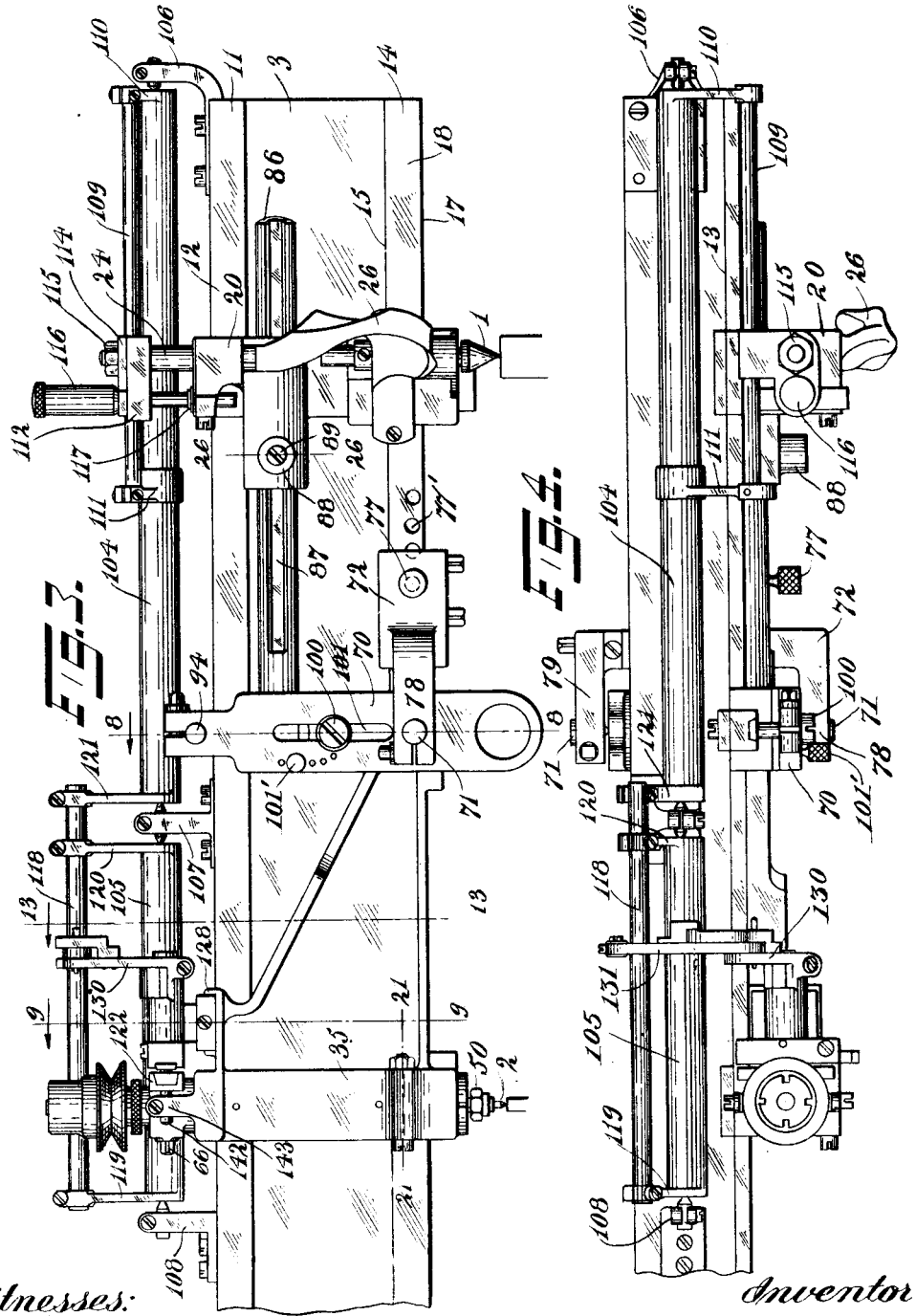

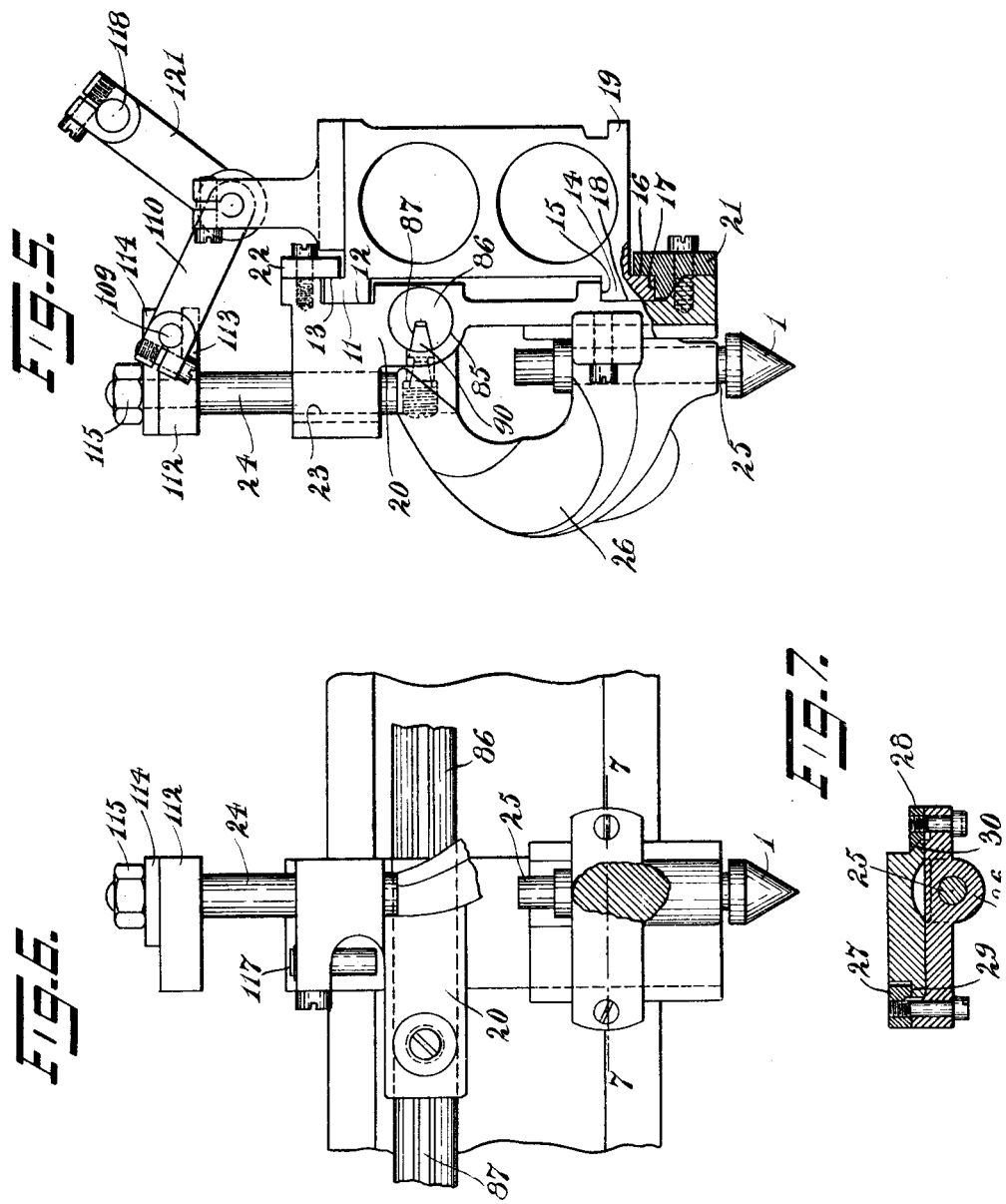

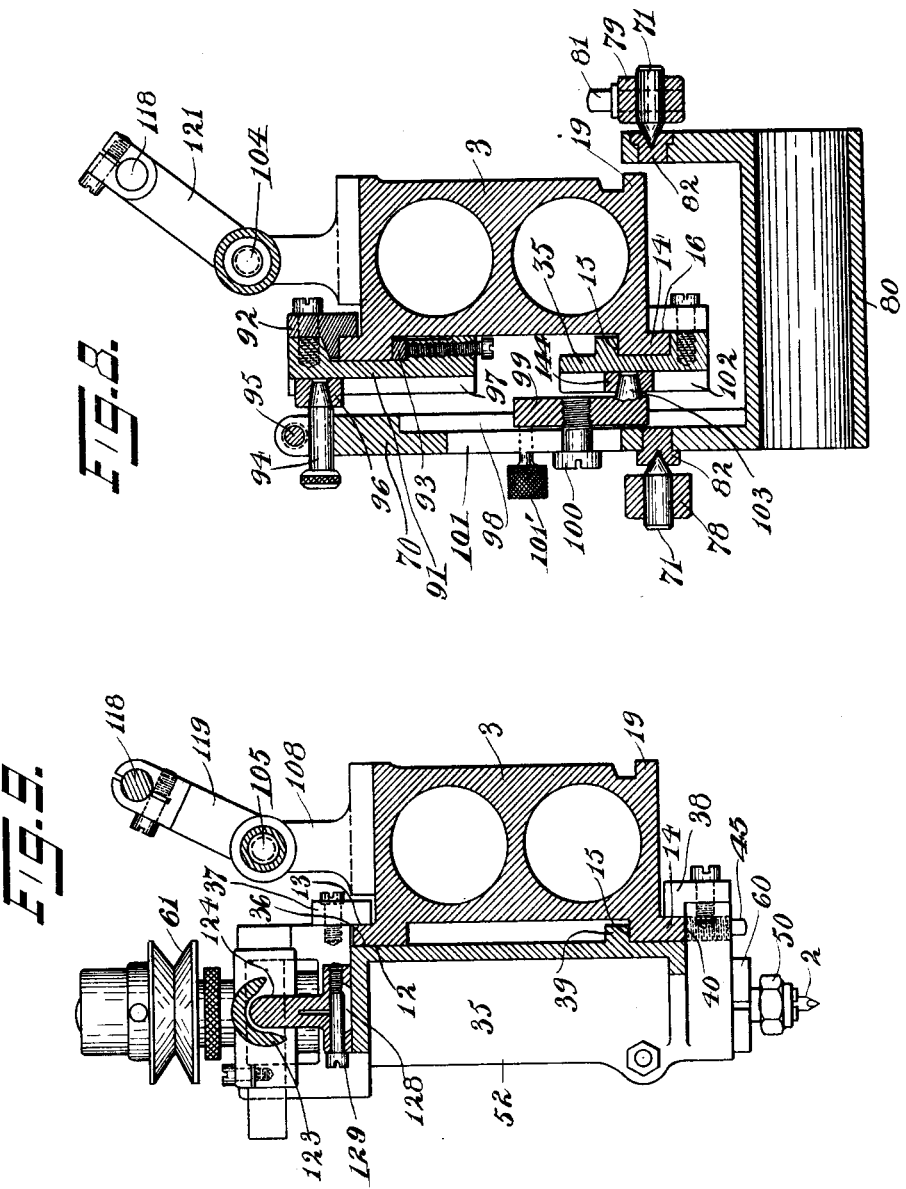

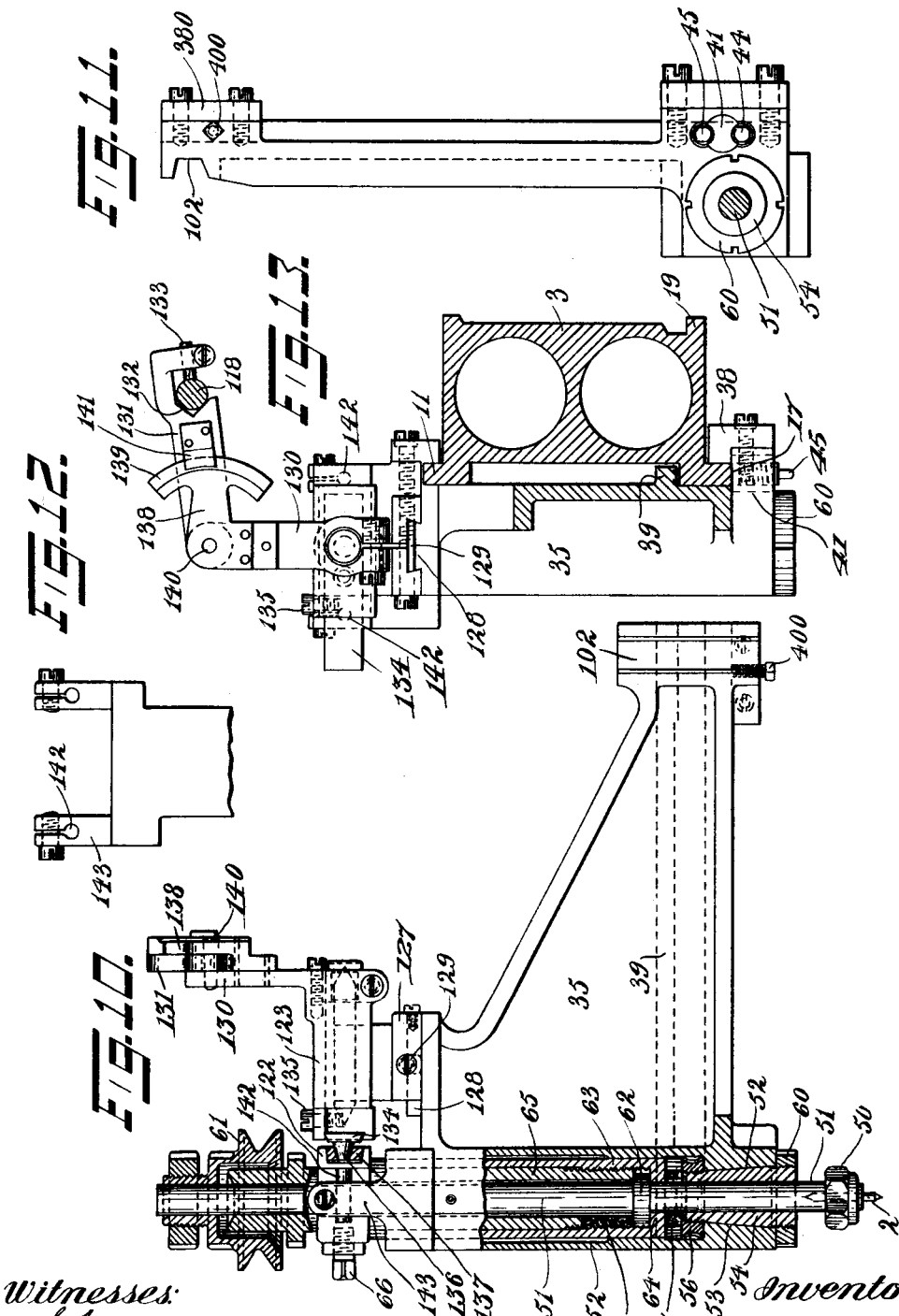

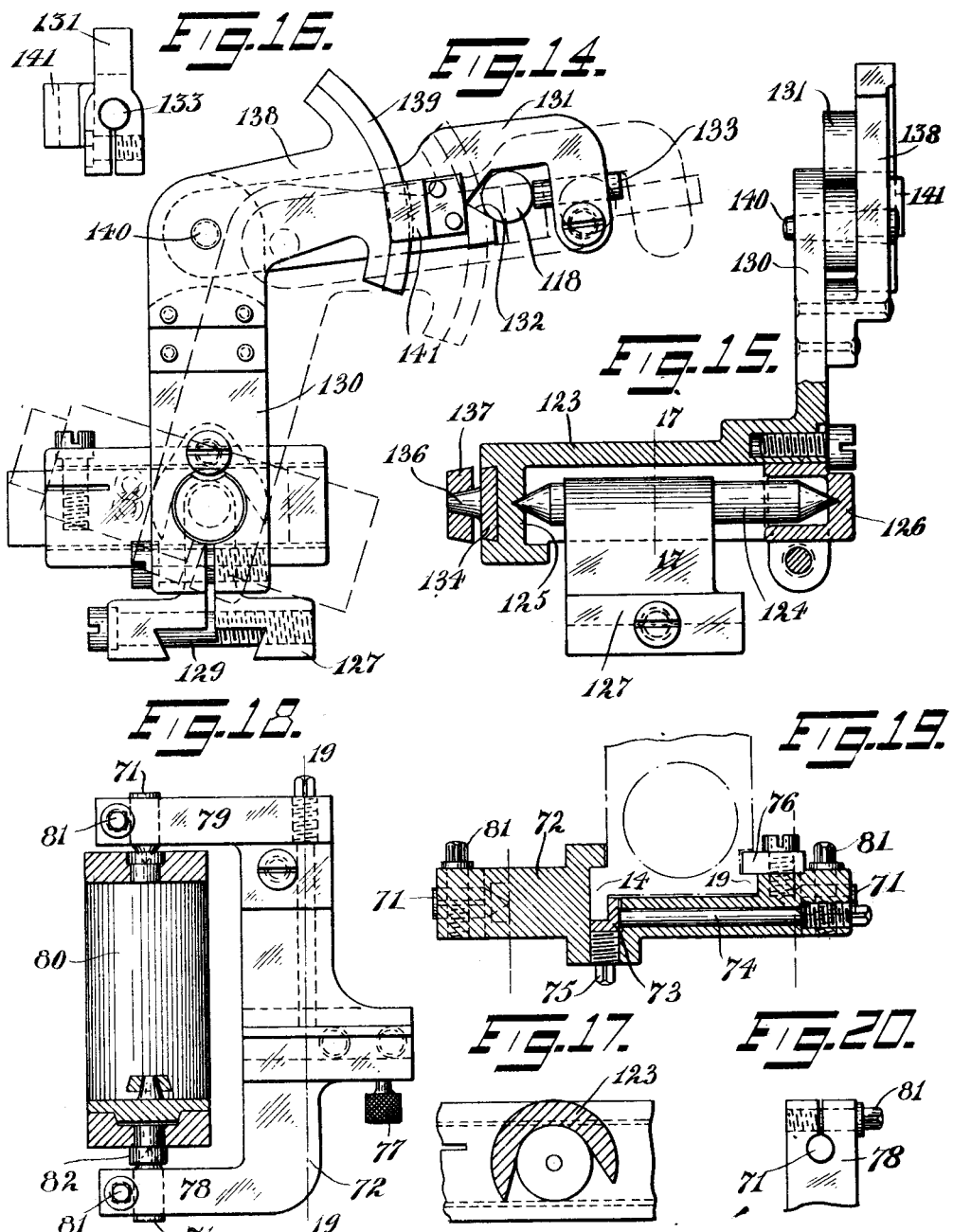

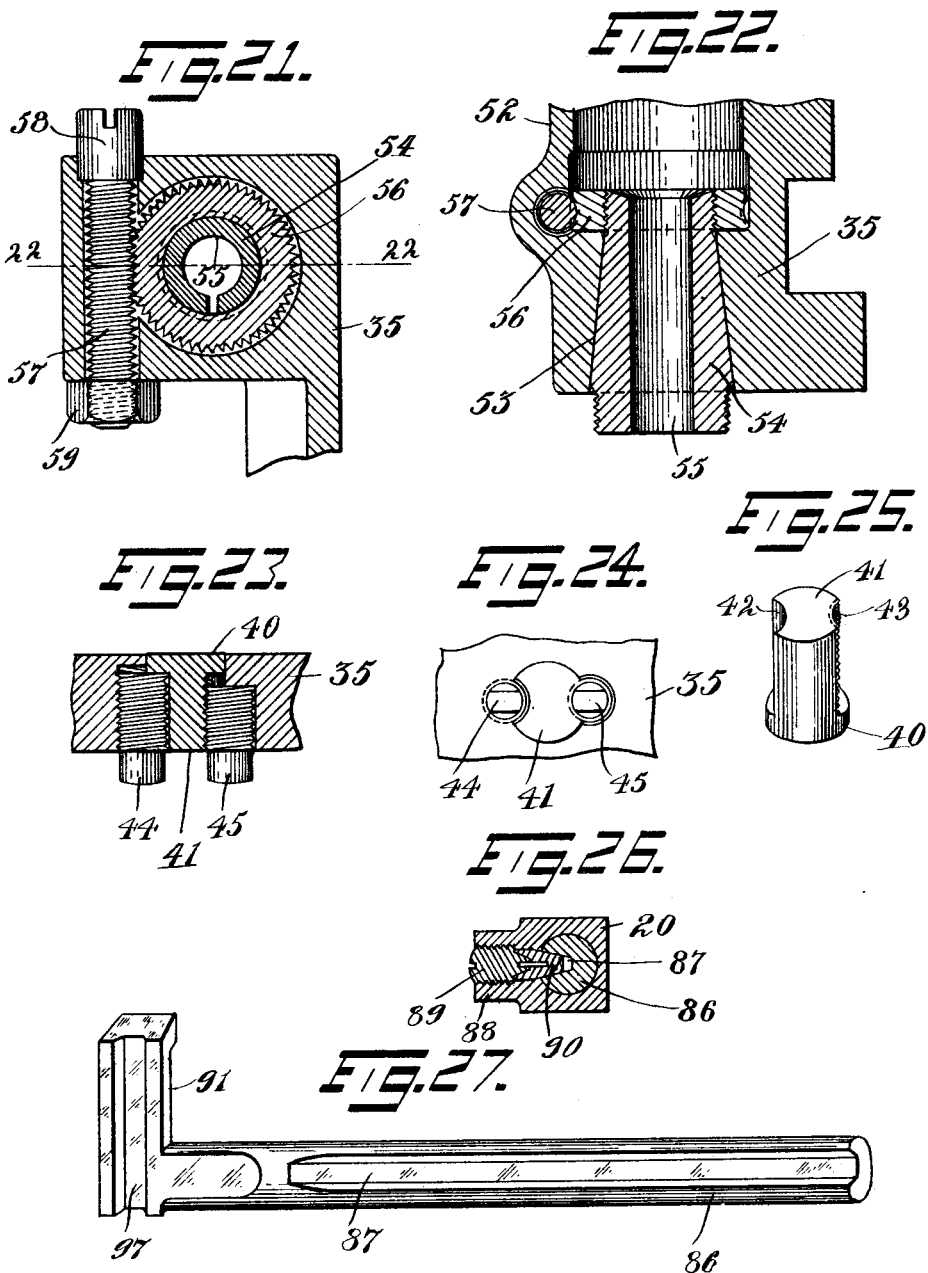

F. H. RICHARDS.
PANTOGRAPHIC MILLING MECHANISM.
APPLICATION FILED FEB. 25, 1910.
1,117,245.
Patented Nov. 17, 1914.
11 SHEETS—SHEET 9.
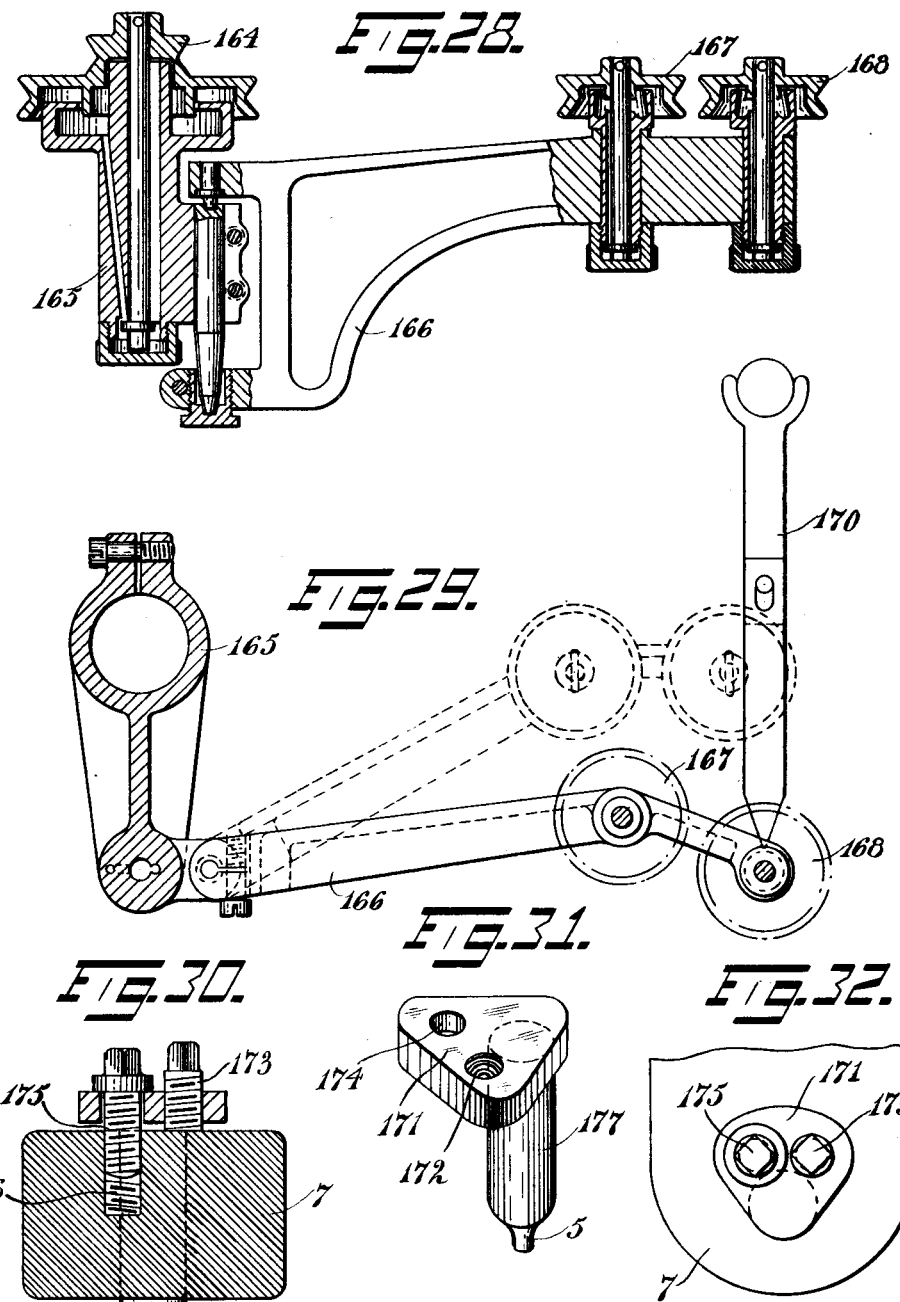

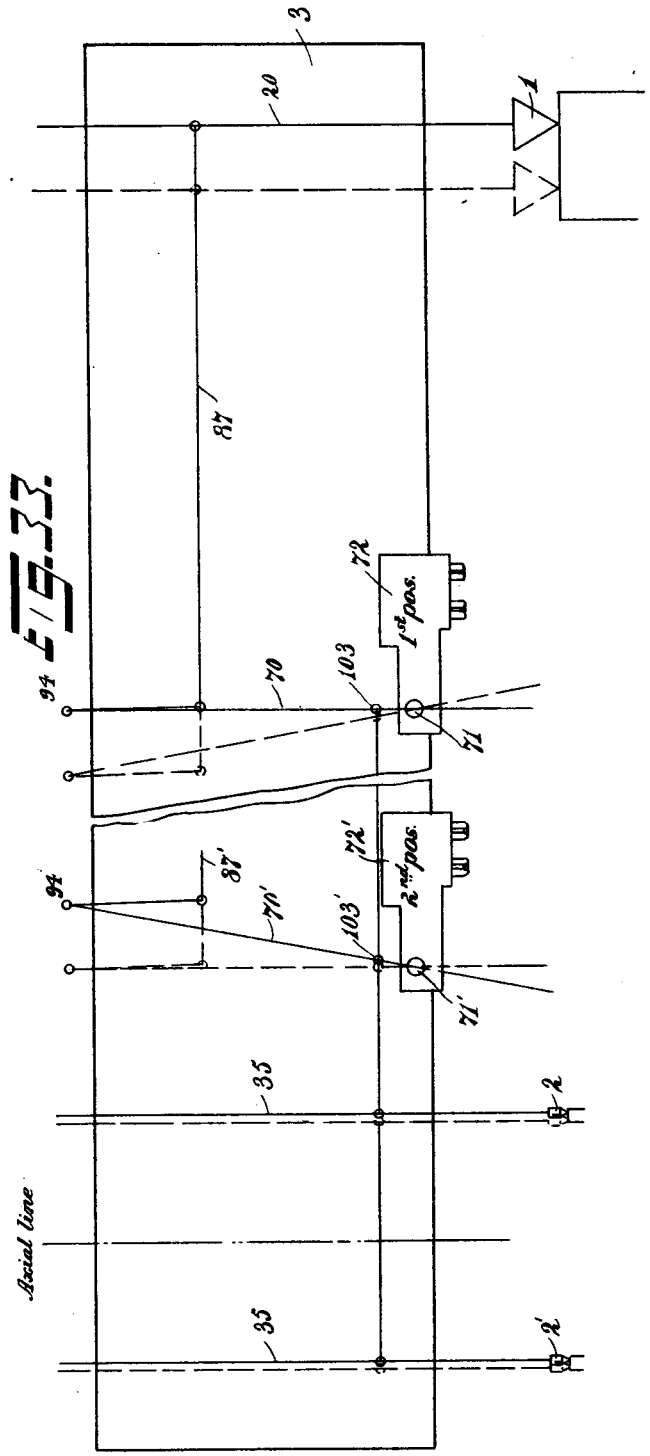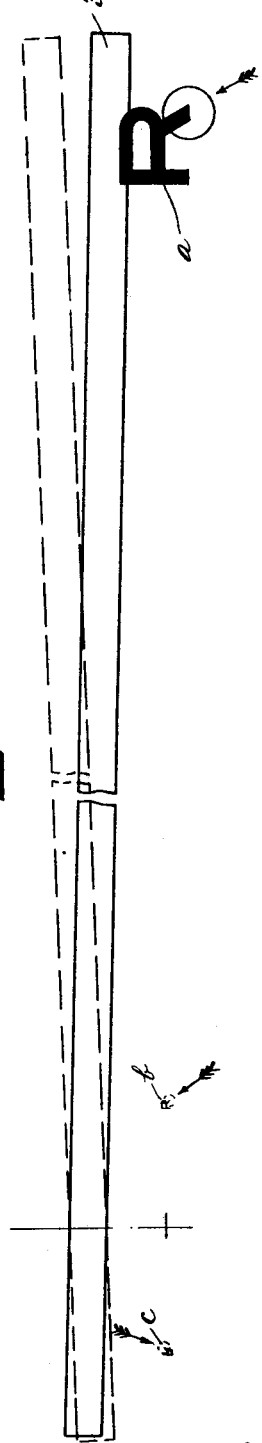

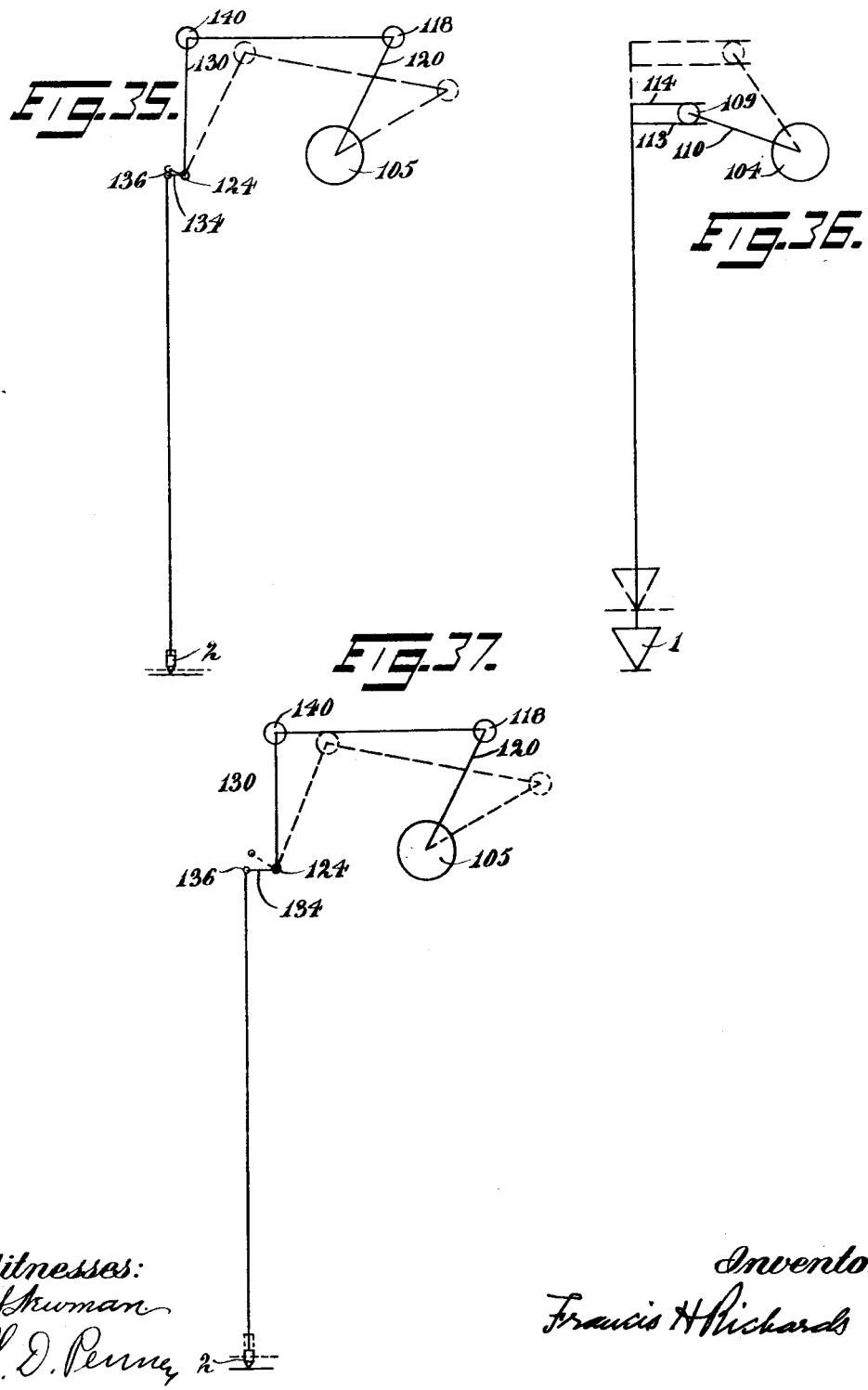

UNITED STATES PATENT OFFICE.

FRANCIS H. RICHARDS, OF HARTFORD, CONNECTICUT, ASSIGNOR TO THE AMERICAN TYPOGRAPHIC CORPORATION, OF NEW YORK, N. Y., A CORPORATION OF ARIZONA.

PANTOGRAPHIC MILLING MECHANISM.

1,117,245.  Specification of Letters Patent.  Patented Nov. 17, 1914.

Application filed February 25, 1910. Serial No. 545,948.

*To all whom it may concern:*

Be it known that I, FRANCIS H. RICHARDS, a citizen of the United States, residing in Hartford, in the county of Hartford and State of Connecticut, have invented certain new and useful Improvements in Pantographic Milling Mechanism, of which the following is a specification.

This invention relates to mechanism for accurately effecting pantographic results.

The object of the invention is to provide reproducing mechanism in which the working tool of whatever nature this may be, as for instance a milling tool, is movable in each of three directions each transverse to each of the others, and the ratio of which movements are capable of being severally adjusted each independently of the others in respect of the pattern tracer. The movement of the tool relative to the pattern tracer in a measured ratio will be effected by mounting these members upon a bed plate carried by a crane as a beam swinging about a fixed axis. Movement in a transverse direction upon the same plane and movement toward and from such plane will be effected in each instance by a lever train mounted upon and carried by the bed plate or swinging beam. Some of the movements of the tracer in a straight line path result in movements of the follower, which in the present illustration is a working tool, in a straight line path, and are conveyed through an angularly movable part. Reciprocation in a straight line path is converted into angular movement of an oscillatory member and this angular movement is converted into reciprocation of the follower in a straight line path. The relative positions of the points of connection between the angularly movable member and the tracer and the follower effect movement in a measured ratio between the tracer and the follower. The connections between the parts moving in a straight line path and the angular movable part have a sliding engagement in a direction transversely of such straight line path of movement. The angularly movable member in each instance transmits movement in a straight line path from one member to another, thereby neutralizing the "crank motion" error.

This improvement is particularly adapted for use in the manufacture of master type and in forming hard metal dies and matrices particularly those for use in the typographic art.

The tracer and the follower will both be mounted on the same side of the axis of the beam for positive reproductions of the pattern. But by changing the position of the work-holder and the tool carrier from one side of the axis of the beam to the other side the product may be reversed end for end and side for side in respect of the pattern. If the pattern tracer and working tool are both upon the same side of the axis of the beam, and the working tool is nearer the axis than is the tracer the product will be a miniature of the pattern. If the working tool and tracer are placed upon opposite sides of the axis of the beam the product will be a reversal from the pattern. The reproduction may thus be either a positive miniature of the pattern or it may be a reversed or negative miniature.

The device is termed "pantographic" not because its mechanism embodies a proper pantograph but because it performs the work which the pantograph is intended to do but which the pantograph also fails to do accurately.

The drawings which accompany and form part of this specification are made from a working mechanism embodying my invention.

Figure 2:
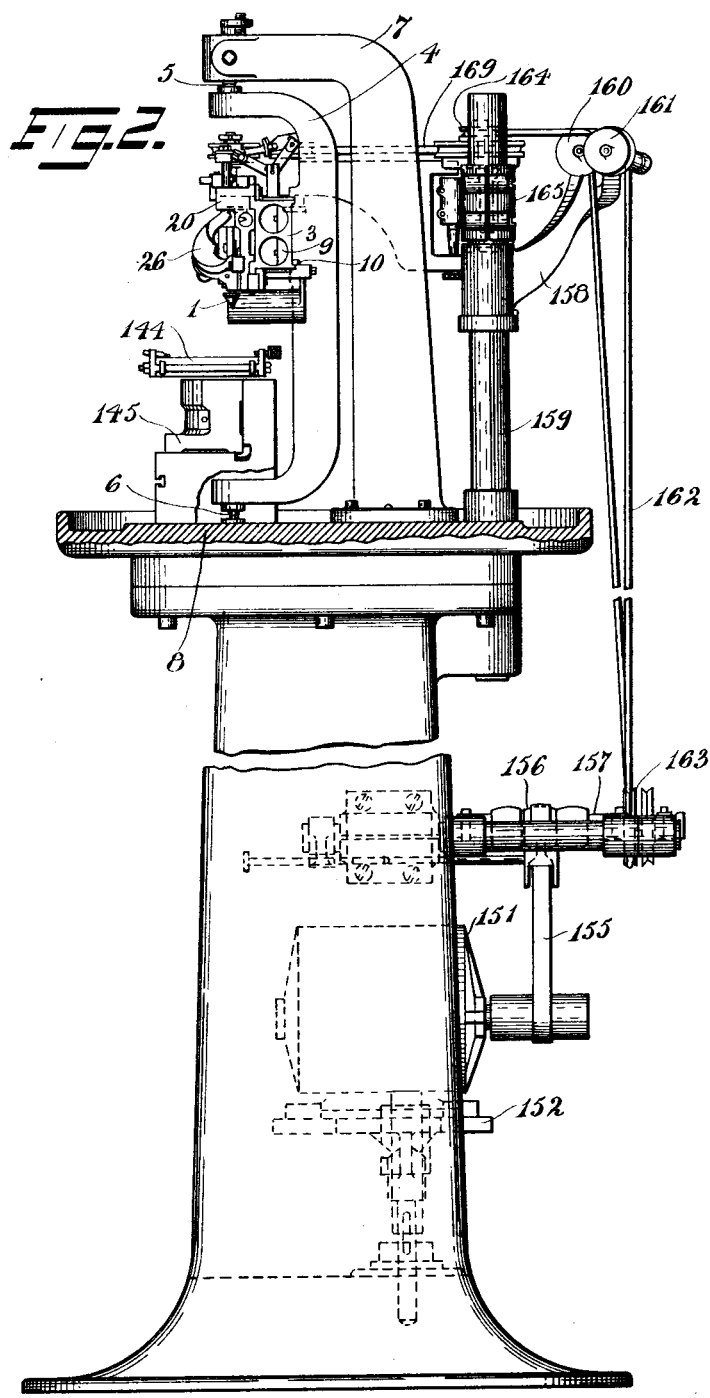

Figure 1 of such drawings illustrates a front elevation of the machine. Fig. 2 is an end elevation of the machine looking at this from the right hand end of Fig. 1. Fig. 3 is a front elevation of the beam and its associated parts detached from its carrying crane. Fig. 4 is a top plan view of the mechanism illustrated in Fig. 3. Fig. 5 is an end elevation of the left hand end of the beam and shows the pattern tracer and its carriage. Fig. 6 is a front elevation of the parts shown in Fig. 5, the beam and some of the other portions being broken away. Fig. 7 is a horizontal section taken at about the plane of the line 7—7 of Fig. 6, illustrating the manner in which the lower portion of the pattern tracer is mounted upon its carriage for vertical reciprocation. Fig. 8 is a vertical cross section through the beam and associated levers on a plane at about the line 8—8 of Fig. 3, looking toward the left. Fig. 9 is a vertical cross section taken on a plane at about the line 9—9 of Fig. 3, looking toward the left. Fig. 10 is a front elevation, partly in longitudinal section, of the tool spindle carriage, the tool spindle, and associated parts. Fig. 11 is an underside view of the tool spindle carriage. Fig. 12 is a detail of a portion of the tool spindle carriage shown in a position at about the right angles to the position which the same parts occupy in Fig. 10. Fig. 13 is a cross section taken on a plane at about the line 13—13 of Fig. 3, looking toward the left, it also being in part a view from the right hand end of Fig. 10, and illustrating the connection between the rock shaft upon the tool spindle carriage and the rock shaft upon the beam. Fig. 14 is an enlarged view of the rock-shaft connecting mechanisms illustrated in Fig. 13 detached from the carriage. Fig. 15 is a front elevation, partly in section, of the parts illustrated in Fig. 14, these being in the same positions which they occupy in Fig. 10. Fig. 16 illustrates the right hand end of the lever in Fig. 14 viewing this from the right hand side of such figure. Fig. 17 is a detail in cross section taken on a plane at about the line 17—17 of Fig. 15. Fig. 18 is a top plan view of the adjustable fulcrum carrier for the carriage connecting lever, this lever being shown in horizontal cross section in this view. Fig. 19 is a vertical cross section taken on a plane at about the line 19—19 of Fig. 18, the lower portion of the beam being shown in dotted lines. Fig. 20 is a detail of one of the pivot carrying arms of the fulcrum member illustrated in Fig. 18. Fig. 21 is an enlarged horizontal section taken on a plane at about the line 21—21 of Fig. 3, it being taken through the lower left hand end of the tool spindle carriage. Fig. 22 is a vertical cross sectional view of the same parts taken on a plane at about the line 22—22 of Fig. 21. Fig. 23 is a vertical longitudinal view of a device in the nature of a gib for adjusting the play of the tool-spindle carriage upon the guide rail of the beam. Fig. 24 is a top plan view of the parts illustrated in Fig. 23. Fig. 25 is a perspective view of the gib or bearing member detached. Fig. 26 is a cross section of the connecting bar between the pattern tracer carriage and the lever connecting the carriages, and is taken at about the line 26—26 of Fig. 3. Fig. 27 is a perspective view of such connecting bar. Fig. 28 is an elevation partly in longitudinal section of a belt carrying device. Fig. 29 is a top plan view thereof partly shown in horizontal section. Fig. 30 is a detailed view partly in longitudinal section of a pivot and pivot adjustment for the crane which carries the bed plate beam. Fig. 31 is a perspective view of the pivot detached. Fig. 32 is a top plan view of the parts illustrated in Fig. 30. Fig. 33 is a diagram illustrating the front elevation of the beam and the lever connections between the pattern tracer carriage and the tool spindle carriage, and corresponding to Fig. 3. Fig. 34 is a plan view detail or diagram of the same parts and relations, and corresponding to Fig. 4. Fig. 35 is a diagram illustrating the movement of the tool spindle. Fig. 36 is a diagram illustrating the corresponding movement of the pattern tracer; and Fig. 37 is a diagram illustrating the movement of the tool spindle incident to a different adjustment from that for effecting the movement illustrated in the diagram of Fig. 35.

As was stated in the preamblatory description, the object of the present embodiment of this invention is to permit a pattern tracer to control a working tool, in the form of a rotary miller and cause this to follow the pattern tracer in unison at a measured ratio in three directions each disposed at right angles to each of the others, and to afford means for adjusting the ratio of each movement independently of each of the others, and for also permitting the same ratio of reduction or enlargement to be effected in each of the three directions of movement.

The pattern tracer, designated herein by 1, and the working tool, designated herein by 2, are carried by the bed plate 3 of the machine, and all the operative connections between such pattern tracer and working tool are mounted upon such bed plate. The bed plate is in the form of a swinging beam. And to avoid confusing this member with some fixed part of the machine frame it will be hereinafter referred to as the beam. The beam itself is provided with a pivotal support having a fixed axis. It is mounted upon a crane 4 which is supported in pivotal bearings at 5 and 6, respectively carried by an arm 7 and by the main portion 8 of the framing of the machine. The axes of the pivots 5 and 6 are disposed in the present instance in a vertical line. For convenience of the present description it will be assumed that the axis of the crane and consequently the axis of the beam is in a vertical position and that the beam is so secured to the crane that it will swing in a horizontal plane. Since the beam is really the bed plate of the machine and it and its associated parts necessarily must be heavy the best results for accurate work will be secured when such axis is vertical. The operator in such a construction will not have to overcome gravity either in starting or stopping the motion of the beam or of the parts which are mounted thereon to move upon ways transverse to such axis, which, of course, in the present illustration is horizontal.

In the end and cross sectional views of the beam it will be noted that this is provided with a pair of longitudinally disposed bores. These are for convenience in manufacture and do not perform any material function in the operation of the machine. They do, however, afford convenient housings for the clamp members 9, which receive the screws for bolting the beam to the crane. Wedges 10 are driven between shoulders on the crane and the top of the beam for precisionizing the position of the beam into a horizontal position. Before passing from the description of the beam, or bed plate, itself, to the mechanisms mounted upon it attention is called to its formation. Its cross sectional formation is uniform from end to end. It is provided at its front side at top and bottom, see for instance, Fig. 5, with rails constituting guides or ways, the top rail 11 is provided with a guide surface 12 at its front and a guide surface 13 at its rear. The bottom rail 14 is provided with a guide surface 15 at its top, a guide surface 16 at its rear, a guide surface 17 at its bottom, and a guide surface 18 at its front. The beam at its lower rear side is also provided with a guide rail 19.

The pattern tracer and the working tool are mounted upon their carriages for movement upon such carriages transversely of the beam. And the carriages are mounted upon the beam for longitudinal movement thereon. The pattern tracer carriage 20 is mounted upon the rails or ways of the beam for longitudinal movement thereon. The engagement with the lower rail is such that fixed faces upon the carriage engage the top and front faces 15 and 18 of the rail and an adjustable gib or friction member 21 engages the rear and bottom faces 16 and 17 of such bottom rail. A fixed face at the upper portion of the carriage engages the face 12 of the upper rail and an adjustable engaging member 22 engages the rear of the upper rail.

The upper portion of the carriage is provided with a bearing 23 for receiving the shaft or spindle portion 24 of the pattern tracer. The pattern tracer 1 is shown of conical formation and carried by a stem 25, which stem is mounted in a handle 26. The lower portion of the handle carries the gib members 27 and 28 for running upon ways 29 and 30 at the lower portion of the carriage, the ways 29 and 30 being disposed parallel with the bore 23. Such ways are adjacent to the connection between the carriage and the bottom rail. It will thus be seen that the movement of the pattern tracer relative to the carriage upon which it is mounted is in a vertical direction transversely of the beam; that the bearing faces for preventing transverse play of the carriage upon the ways engage the faces upon the top and bottom of the bottom rail; and that such rail is also engaged upon its front and rear faces for preventing play in an opposite transverse direction in a horizontal line incident to the tracer moving the beam through its carriage. The horizontal play is also prevented by the engagement of the front and rear of the top rail. The weight of the carriage also it will be seen will be borne by the lower rail thus lowering the location of the center of gravity.

The tool spindle is mounted upon the tool spindle carriage 35. This carriage is supported by the beam and is mounted upon the ways afforded by the rails 11 and 14 upon which the pattern tracer carriage is also mounted. A face 36 at the rear of the top of the carriage 35 engages the front face 12 of the rail 11. A clamping member 37 is secured to the carriage and engages the rear face 13 of such rail 11 thus clamping the front and back of such rail. This carriage, as does also the carriage for the pattern tracer, engages the top rail at the front and rear; but does not engage the top and bottom of this rail. Faces fast with the lower portions of the carriage engage the faces 15 and 18 of the lower rail. A clamping member 38 is secured to the lower portion of the carriage for engaging the rear face 16 of the lower rail. These bearing surfaces just described are at the portion of the carriage at which the tool spindle housing is located. A rail 39 extends the entire length of the lower portion of the carriage and has bearing faces at each end for engaging the top face 15 of the lower rail. The engaging portion adjacent the tool spindle housing is of considerable extent longitudinally of the rail upon which it bears and below its center portion there is provided an adjustable gib member, designated in Fig. 9 by the reference character 40, and shown in detail in Figs. 23, 24 and 25. The ends of the bearing portion of the rail 39 and this adjustable gib constitute as it were a three point bearing for preventing any tendency of rotation of the spindle housing portion of the carriage. It will be seen that both the carriages have a secure engagement with the top, bottom, front and rear of the lower rail and engagement with the front and rear of the top rail.

In Figs. 9 and 11 the lower portion of the right hand end of the tool spindle carriage is illustrated, and this is provided with a gib or clamping member 38 for engaging the rear face 16 of the bottom rail and with an adjustable gib 41 for engaging the lower face 17 of such rail. This carriage, it will be seen has two widely separated regions of contact with the lower rail. At each of these regions of contact all four sides of the rail are engaged. Thus it will be seen that vibrations of the tool independently of the beam will be impossible. The adjusting member or gib 40 is shown as comprising a circular head and a stem 41, one side 42 of which stem has a plain concave surface and the other side 43 of which has a concave surface provided with screw threads. The lower portion of the carriage has bearings provided for receiving the member 40 and its set screws 44—45. The screw 44 is seated in a tapped bore in the carriage and engages at its end the rear of head 40 for forcing the same outwardly and into engagement with the beam. The set screw 45 is mounted in a plain bore and engages the screw threads 43, and bottoms in its bore for effecting a retraction or a locking movement of the member. This device is employed for effecting accurate position of the tool spindle carriage upon the ways of the beam. Such carriage is somewhat of a lever formation and ordinary gibs would not afford the permanency of precision which is essential, especially in a device where the ratio of reduction between the pattern and the product is large, as for instance, in the present construction, a reduction of twenty-five to one is frequently effected.

The working tool 2, in the present instance a rotary milling tool, is carried by a chuck 50, carried by a tool spindle 51. A housing 52 is provided upon the carriage 35, and in the present illustration is shown as integral therewith. The lower portion of the housing 52 has within it a downwardly directed or outwardly opening conical face 53 in which a conical bearing member 54 is mounted, see Figs. 10, 21 and 22. The conical bearing member 54 is longitudinally split and is provided with a bore or bearing face 55 for the lower portion of the spindle 51. The longitudinal adjustment of the conical bearing member 54, for varying the diameter of its bore 55, is effected by means of a screw collar 56 having screw threaded engagement with the upper end of the member 54, and abutting against a suitably provided face within the housing 52. Rotation of the ring or collar 56 is effected by means of a worm 57 engaging worm teeth in the perimeter of the ring or collar 56. One end of the worm is provided with a head 58 which engages an abutment and is formed for the engagement of a screw driver. A nut 59 is mounted upon the other end of the worm for locking the parts in their proper position of adjustment. The parts are further locked in position by means of a set nut 60 upon the lower end of the conical member 54. By this means it will be seen that ready and accurate adjustment of the bearing for the lower or working end of the spindle may be effected.

The manner of reciprocating the tool spindle 51 upon its carriage, and in a path parallel with the axis of the crane will now be described. The spindle is provided with a pulley 61 for rotating it. The spindle has upon it an enlargement in the nature of a collar 62. Within the housing 52 there is a sleeve 63 having an inturned end 64 engaging the lower face of the collar 62. The lower portion of the sleeve 63 is interiorly screw threaded. Within sleeve 63 and surrounding the spindle but free from engagement therewith is another sleeve 65 having at its lower portion screw threaded engagement with the screw threaded interior of the sleeve 63. The sleeve 65 at its lower end engages the upper face of the collar 62. Suitable clamping means 66 is provided for clamping the sleeves 65 and 63 together for preventing their movement one in respect to the other, which movement will either loosen or tighten their engagement upon the collar 62. The spindle and its collar 62 will rotate within the sleeves 65 and 63. Such sleeves are for effecting a longitudinal reciprocation of the spindle. Suitable lubricant receiving packing 67 may surround the spindle below the engaging portion 64. And the sleeve 65 may have a longitudinal slit in it for receiving similar packing 68. The connections for reciprocating the tool will be described in the proper place.

The movement in unison of the pattern tracer and tool toward and from the axis of the beam is effected by a lever train fulcrumed upon the beam and connected to the carriages. The connecting lever 70 has its fulcrum at its pivots 71. The fulcrum pivots are supported by a fulcrum member 72 mounted upon the lower rail 14 and the rail 19 (see Figs. 8, 18 and 19). It will be seen that the fulcrum member has a face for engaging the top, bottom, front and rear faces of the bottom rail 14 of the beam, and faces for engaging the top and bottom of the rail 19. The body of the member 72 carries faces upon it for engaging the front and top of the bottom rail, and carries an adjustable member 73 for engaging the rear and bottom of such rail. The respective adjustment for these engagements being effected by screws 74 and 75. The body portion also carries a face for engaging the rear of the rail 19 and an adjustable member 76 for engaging the top of such rail, a suitable set screw being provided for operating this part. By this means when the fulcrum member is slid along the rail 14 to its proper position it may be there clamped and securely held. For the purpose of indexing the position of the fulcrum member an index pin 77 is provided which will enter suitably prepared notches or holes 77', which are arranged at intervals along the lower rail 14, Fig. 3. The fulcrum member is provided with arms 78—79 at its front and rear, which carry the pivot pins 71 determining the fulcral axis. Such pins are shown as engaging the front and rear limbs of the lever 70. Such limbs are connected together by means of a shaft 80. The shaft 80 is shown as tubular for affording great strength with a minimum amount of metal. The fulcrum pins 71 are mounted in smooth bores in the arms 78—79, the ends of the arms being split into such bores and the bore clamped upon the pin by means of a set screw 81. The fulcrum pins 71 are illustrated, particularly in Fig. 8, as seated in hardened bearing members 82 carried by the lever. The bearing sockets of these members are at the same angle as are the conical ends of the pins.

The pattern tracer carriage is provided with a socket 85 for receiving the connecting bar 86 connected to the lever 70. The longitudinal reciprocation of the carriage is translated into an oscillation of the lever 70 by means of the connection. The connecting bar is shown as provided with a longitudinally disposed groove 87 having tapering sides, see Figs. 26 and 27. The socket 85 is provided with a tapped boss 88 for receiving a set screw 89. This screw is provided with a slotted conical end for engaging a key member 90, which is seated partly in the untapped portion of the bore of the boss 88, and partly in the longitudinal groove 87. When the set screw 89 is screwed against the key member 90, which is slotted, all the parts will be flexed together into a tense condition of rigidity. This will hold the connecting bar rigid with the carriage. It will become practically a part thereof. To afford greater security in movement the outward end of the connecting bar has intimate connection with the top rail 11 of the beam. A rear face 91 upon the transversely projecting portion of the connecting bar engages the front face 12 of the top rail 11. The top and rear face of such rail are engaged by an adjustable gib member 92 and the bottom face of such top rail is engaged by an adjustable gib member 93 so that this outward end of the connecting bar is caused to engage the rail of the beam at its top, bottom, front, and rear.

The lever 70 carries at its upper end a pin 94 which is held in position by the split end of the lever and set screw 95. Such pin has a conical end which is seated in a similarly formed conical seat in a slide 96, which is mounted in the ways 97 in the transverse end of the connecting bar. The ways 97 are disposed in a vertical position and consequently transversely of the ways upon the beam and parallel with the axis of oscillation thereof. In the present construction the oscillation imparted to the lever 70 incident to the longitudinal transverse of the carriage upon the beam is constant and unadjustable. The adjustment of the ratio of movement between the tracer carriage and the tool spindle carriage is effected by the connection between the latter carriage and the lever 70. The lever 70 is provided with ways 98 disposed radially in respect of the fulcrum 71 of such lever. A connecting member 99 is adjustably mounted in the ways 98 and is clamped in its various positions of adjustment by means of a set screw 100 which traverses a slot 101 in the lever. An index pin 101' for engaging suitable holes determines the position of slide 99. The end of the tool spindle carriage which is toward the lever 70 and toward the pattern tracer carriage is provided with transverse ways 102, that is the ways are disposed in a vertical position and transversely of the rails on the beam. The connecting member 99 carries a conical engaging portion 103 which is seated in a similarly formed recess in a slide 104 mounted in the ways 102. The center of the engaging portion 103 is located nearer the fulcrum 71 than is the center of the pin 94 which connects such lever to the pattern tracer carriage. For this reason the movement imparted from the pattern tracer carriage to the work spindle carriage through the lever 70 will be a reduced movement. In the drawings the parts are set for making a positive reproduction and consequently the engaging members 94 and 103 are shown upon the same side of the fulcrum 71 and the pattern tracer and working tool are also shown upon the same side of the axis of the beam.

The connection between the carriages for constraining the tool spindle carriage to move in unison with the pattern tracer carriage are, of course, for effecting movements toward and from the axis of the beam. The beam as it swings upon its axis effects one movement of the parts relative to the other for producing a reduction of movement. The ratio, of course, in this instance being determined by placing the parts in such a position that the lever 70 will assume a vertical position and adjusting the position of the parts so that the distance between the axis of the bed plate or beam and the axis of the tool spindle will be in measured ratio to the distance between the axis of the tool spindle and the axis of the pattern tracer. If it is desired to have uniform reduction of the pattern the connecting point 103 between the lever 70 and the tool spindle carriage will be so adjusted that the movement between the carriages will be reduced upon a ratio similar to that effected by the swinging of the beam. This gives a movement transverse to the movement effected by the swinging of the beam upon its axis. The third movement is at right angles to each of these and is effected by a movement of the pattern tracer and the following movement of the tool spindle transversely of the beam. In the present instance the transverse movement of the tool following the transverse movement of the pattern tracer, that is transverse in respect of the ways upon the beam, is effected by an axial reciprocation of the tool spindle in a path parallel with the axis of the beam. The movement in unison of the pattern tracer and the tool spindle in paths parallel with the axis of the beam is effective by a lever train fulcrumed on the beam and connecting these members together. These members, the pattern tracer and the tool spindle, are, as was before stated, each mounted upon its carriage for movement transversely of the direction of the carriage movement upon the ways of the beam.

A rock shaft, which constitutes a part of the lever train for effecting the parallel movements above referred to, is mounted upon the top of the beam and has its axis disposed parallel with the rails or ways carried by the beam for supporting the carriages and other parts of the mechanism. This rock shaft in the present instance comprises two members 104 and 105 secured together to oscillate in unison upon the same axis. For the purpose of securing rigidity in a relatively light structure the rock shaft is made in two portions. The portion 104 of the rock shaft is mounted on pins carried by the standards 106, 107. The portion 105 of the rock shaft is mounted on pins carried by standards 107 and 108. The standard 107 is located at the juncture or the interruption in the rock shaft. These standards are securely mounted upon the beam. The rock shaft, in the present instance the portion 104, carries an elongated wrist member 109 which is supported at its respective ends by rock arms 110 and 111 rigidly mounted upon the rock shaft. The wrist member 109 is for effecting the connection between the pattern tracer and the rock shaft. The shaft or spindle portion 24 of the pattern tracer has fast upon it a member 112 provided with a pair of engaging faces located transversely of the direction of reciprocation of the shaft 24 which securely engage the opposite sides of the wrist member 109. In the present illustration it will be seen that the lower jaw, as it were, 113, of this engaging member is carried by a rather substantial part and that the upper jaw 114 is made upon a separate piece which is secured in position by means of the nut 115 upon the upper end of the spindle 24.

The member 112 is provided with a micrometer device 116 for engaging an adjustable fixed face 117 upon the frame of the pattern tracer carriage for adjusting the normal downward movement of the pattern tracer and consequently adjusting the limit of movement of the rock shaft in one direction. The rock shaft carries a second elongated wrist member 118 which is carried by arms 119—120 on the shaft member 105 and an arm 121 upon the shaft member 104. The arms 120 and 121 are at the abutting ends of the rock shaft members 104 and 105, and by means of the connection between such arms and the arms 119 and the wrist pin member 118 a rigid connection between portions of the rock shaft is afforded and a rigid connection between the wrist pins 109 and 118 is also afforded. The rock shaft and its associated arms and wrist pins constitute a lever, as it were, in the lever train between the pattern tracer and the tool. The sleeve 63 has fast upon it a member 122 which is provided with a guideway disposed transversely to the axis of the tool spindle 51, and which is also disposed transversely to the axis of oscillation of the rock shaft mounted on top of the beam. Since the tool spindle carriage reciprocates during its working and such reciprocation is, when the ratio of reduction is great, a very small amount, the connection between the wrist member 118 of the rock shaft and the tool spindle must be such that the reciprocation of the carriage will not interfere with the axial movement of the tool spindle.

A counter rock shaft, as it were, is mounted upon the tool spindle carriage and is disposed in parallelism with the rock shaft on top of the beam. The counter rock shaft is in its form somewhat in the nature of a housing 123 and has its pivotal contacts within it, it being mounted upon a pivot member 124 which is provided with conical ends, one of which is seated in a conical recess in the end 125 of the housing and the other of which is seated in a conical recess in a detachable end 126 of the housing. This structure gives accuracy and rigidity and permits a free oscillation of the rock shaft. The spindle or pin 124 is in the present instance made integral with a portion 127 which is in the nature of a tool slide mounted and clamped upon ways 128 upon the tool spindle carriage, the clamping being effected by means of a screw 129. The counter rock shaft carries a rock arm 130 which has pivoted to it a link 131 for engaging the wrist member 118. The link member is provided with a V-shaped recess 132 for engaging one side of the wrist member and with an adjustable point bearing 133 for engaging the opposite side. By this means as the rock shaft upon the top of the beam oscillates the oscillation will be communicated to the counter rock shaft. The counter rock shaft carries an adjustable member 134 in the nature of a slide which may be slid in ways in the housing portion of the counter rock shaft and will be clamped in its position of adjustment by means of a set screw 135. The adjustable member 134 carries a conical engaging point 136 which is seated in a slide 137 traversing the ways 122. By adjusting the point 136 in relation to the axis of the counter shaft the amplitude of reciprocation of the tool spindle 51 will be varied.

It will be seen from the foregoing that the reciprocation of the pattern tracer transversely of the ways or rails upon the beam and in a direction parallel with the axis of the beam, will, through means of the lever train above described, cause the tool to reciprocate in a parallel path in unison in a measured ratio predetermined in the construction of the machine and adjusted by means of the adjustment of the slide 134. The relative horizontal planes of the tool and the pattern tracer will be effected by means of the micrometer stop 116.

To prevent the faces which engage the wrist member 119 binding and pinching the pivot and twisting the various parts as the tool spindle carriage is reciprocated the rock arm 130 has fast with it an arm 138 which carries a sector 139 struck from the center of the pivot 140 which pivots the link 131 to such rock arm 130. The sector has engaging faces upon its sides, one of which is in engagement with the link and the other of which is in engagement with a bearing member 141 carried by the link. By means of this sector and its engagement, the link 131 is moved along the wrist member by means other than the pivot pin. The link 131 at its pivoted end is engaged between the arm member 138 and the rock arm 130 for preventing relative movement between the parts other than the movement of the link about its axis. The member 122 carrying the ways for the slide 137 is supported against oscillation by means of adjustable guide pins 142 clamped in arms 143 rigidly secured to the carriage.

The pattern supporting table for the engagement of the pattern tracer is indicated at 144 and is mounted upon the slide 145 mounted upon suitable ways of the table 6 and the work holder 147 is mounted upon the slide 148 mounted upon the same ways. The working position of the working table may be regulated by means of a stop 149 and micrometer 150.

The power in the present instance is supplied by means of a motor 151 mounted upon a vertically adjustable slide 152. The vertical adjustment is effected by means of a nut 153 and screw 154. The vertical adjustment of the motor is for the purpose of tightening the belts. The belt 155 from the motor will run over a set of fast and loose pulleys, designated in a general way by 156 on a countershaft 157.

An arm 158 is mounted upon an upright spindle 159 and carries a pair of idler pulleys 160, 161, over which the belt 162 passes from the pulley 163 on the countershaft to the intermediate driving pulley 164 which is mounted on a bracket 165 fast on the spindle. In the present instance the arm 158 is provided with clutching means whereby the arm may be swung back into an idle position when the machine is not in use. An arm 166 is pivoted to the bracket 165 and carries a pair of idler pulleys 167 and 168 over which a belt 169 passes from the intermediate driving pulley 164 to the pulley 61 on the tool spindle. The axis of the pivot of the arm 166 is parallel to and disposed quite near the axis of rotation of the intermediate driving pulley 164 so that movement of the idler pulleys 167, 168 with such arm toward and from the tool spindle in the limited movement about its axis will have very little effect upon loosening and tightening the belt. A strut member 170 is placed between the end of the arm 166 and a portion of the carriage of the tool spindle so that as the carriage is reciprocated upon the ways of the beam the idler pulleys will move in unison therewith and the belt 167 will be substantially at the same degree of tenseness in whatever position of adjustment the tool spindle happens to be while it is in operation.

The pivot pin 5 for the bed plate carrying crane 4 is an extension of a body portion 177 which fits in a bore in the arm 7. The body portion at its upper end is provided with a head 171 having a tapped hole 172 in which there is mounted an adjusting screw 173, engaging a face at the top of the arm, for adjusting the longitudinal position of the body portion 177 and consequently of the pivot 5. The head is also provided with a smooth bore 174 for receiving an adjusting screw 175 provided with a flanged head resting upon the upper surface of the head 171. The arm 7 is provided with a tapped socket 176 for receiving the screw 175. This screw 175 effects the downward movement of the pivot 5, and the screw 173 effects the upward movement. The screws in conjunction lock the pivot in its proper position.

The diagram shown in Fig. 33 illustrates the movements of the carriages 20 and 35 longitudinally of the beam 3 and in a measured ratio. Movement of the tracer 1 and tracer carriage 20 from the full line positions to the dotted line positions will, through the connecting bar 87 and the pivotal connection 94, shift the lever 70 angularly upon the axis 71 of its fulcrum support 72 from its full line position to its dotted line position. And the angular movement of the lever 70 will be communicated through the pivotal connection 103 to the tool carriage 35 and tool 2 and move these from their full line to their dotted line positions. These movements are in the same direction toward and from the axial line of the beam. If it is desired, however, as was previously stated, to produce a reversal or negative of the pattern the carriage 35 with the tool 2 will be moved into the positions 35', 2' upon the other side of the axial line, and in this instance, although the resultant movement of the tool longitudinally of the beam will be in the same direction as the movement of the pattern tracer, yet, as will be seen by the diagram in Fig. 34, which illustrates the lateral movement of the parts, the work produced will be negative or reversed. The pattern is illustrated at $a$. The product for the first position above referred to is illustrated at $b$ which is a reduction in size of the pattern. The product for the second position, wherein the product is reversed, is illustrated at $c$. By means of the arrows adjacent the positions $a$ and $b$ it will be seen that a movement of the pattern tracer 1 following the pattern $a$, and moving the beam from its full line to its dotted line position, will move the working tool 2, in producing the product $b$, in the same direction. But when the working tool 2 is upon the opposite side of the beam, as for instance in the position 2', a movement of the pattern tracer 1 in the direction of the arrow adjacent the pattern $a$ will move the tool in the direction of the arrow adjacent the representation of the product at $c$. These two diagrams of Figs. 33 and 34 illustrate the movements for producing the area in a horizontal plane, the longitudinal and lateral movements. The diagrams of Figs. 35, 36 and 37 show the relative movements for producing depth of cut in a measured ratio to the movement of the pattern tracer.

The full and dotted line positions in Fig. 35 show the relative amount of movement of the tool 2 which will be produced by the pattern tracer movement from the full to the dotted line positions indicated in Fig. 36. An adjustment of the slide 134 and consequently of the connecting member or pin 136 in such a manner that the center of the pin 136 will be at a greater distance from the center of the pivot 124 of the counter rock shaft in Fig. 37 than in Fig. 35 will effect a greater tool movement for the same amplitude of movement of the tracer.

Having described my invention I claim:

1. The combination with a bed plate, of a crane mounted to swing on one axis only, the bed plate being rigidly secured to the crane and provided with ways vertical to the said axis, a tracer carriage and a cutting tool carriage mounted on the bed plate ways, lever mechanism connecting the carriages, said lever mechanism being fulcrumed to the bed plate, a tracer mounted on the tracer carriage for movement in a path parallel with the said axis, a cutting tool mounted on the tool carriage for movement in a path parallel with the said axis, and lever mechanism connecting the tracer and tool, the said lever mechanism being fulcrumed on the said bed-plate.

2. The combination with a frame, of a table mounted on the frame and carrying a work holder and a pattern holder, a crane pivotally carried by the frame and having its pivot connections at points above and below the table, a beam member in the nature of a bed plate rigidly connected to the crane, a pattern tracer and a working tool carried by the beam, and lever trains carried by the beam for constraining the tracer and the tool to reciprocate longitudinally and transversely of the beam in unison in a measured ratio.

3. The combination with a frame, of a table mounted on the frame and carrying a work holder and a pattern holder, a crane pivotally carried by the frame and having its pivot connections at points above and below the table, a beam member in the nature of a bed plate rigidly connected to the frame, a pattern tracer and a working tool, said tracer and tool being mounted on the beam for reciprocation, the paths of reciprocation of said tracer and tool and the pivotal axis of the crane all lying in the same plane, and connecting means mounted upon the beam and connecting the tracer and tool holder for causing these to reciprocate in unison in a measured ratio.

4. The combination with a frame, of a table mounted on the frame and carrying a work holder and a pattern holder, a crane pivotally carried by the frame and having its pivot connections at points above and below the table, a beam member in the nature of a bed plate rigidly connected to the crane, a pattern tracer and a working tool, said tracer and tool being mounted on the beam for reciprocation, the paths of reciprocation of said tracer and tool and the pivotal axis of the crane all lying in the same plane, and an adjustable lever train mounted upon the beam and connecting the tracer and tool holder for causing these to reciprocate in unison in a measured ratio.

5. The combination with a frame, of a crane pivoted to the frame at two widely spaced apart points, a table carried by the frame adjacent to one of said pivotal points and between the same, and a pattern tracer and working tool mounted on the beam, and a pair of lever trains mounted on the beam and connecting the tracer and tool for respectively causing these to move in unison in a measured ratio toward and from said axis and in paths parallel thereto.

6. The combination with a frame, of a crane pivoted to the frame at two widely spaced apart points, a table carried by the frame adjacent to one of said pivotal points and between the same, a work holder and a pattern holder carried by the table, a beam carried by the crane adjacent to the other of the said pivotal points and between the same, and a pattern tracer and working tool mounted on the beam, and independent independently adjustable lever trains mounted on the beam and connecting the tracer and tool for respectively causing these to move in unison in a measured ratio toward and from said axis and in paths parallel thereto.

7. The combination with a frame, of a crane pivoted to the frame at two widely spaced apart points, a table carried by the frame adjacent to one of said pivotal points and between the same, a work holder and a pattern holder carried by the table, a beam carried by the crane adjacent to the other of the said pivotal points and between the same, and a pattern tracer and working tool mounted on the beam, and connecting means mounted on the beam between the tracer and tool for causing these to move in unison in a measured ratio toward and from said axis and in paths parallel thereto.

8. In a machine having a framing portion, the combination with a table supported by the framing, of a work holder and a pattern holder supported by the table, a crane, pivotal connections between the crane and framing located at positions above and below the table, a beam in the nature of a bed plate carried by the crane, the beam being provided with ways transverse to the pivotal axis of the crane, a pattern tracer, a tool spindle, a carriage mounted on the ways and supporting the tracer for movement in a path parallel with said axis, a carriage mounted on the ways and supporting the tracer for movement in a path parallel with said axis, a carriage mounted on the ways and supporting the tool spindle for movement in a path parallel with the said axis, a rock shaft mounted on the beam, connections between the tracer and said rock shaft for rocking the same upon the reciprocation of the tracer transversely of the ways, a rock shaft mounted on the tool spindle carriage and disposed in axial parallelism with the beam rock shaft, connections between the rock shafts for causing these to rock in unison, connections between the tool spindle and rock shaft on the tool spindle carriage for reciprocating the tool spindle transversely of the said ways, and connections between said carriages for causing these to reciprocate in unison upon the ways.

9. The combination with a beam, means for pivotally supporting the beam, the beam being provided with an upper and a lower guide rail, of a pair of carriages mounted upon said guide rails, each of said carriages closely engaging the lower rail at the top, bottom, front and rear and engaging the upper rail at the front and rear, each carriage being provided with upper and lower bearings, a pattern tracer mounted on the bearings of one of the carriages and having its pattern engaging portion adjacent the lower rail, a tool spindle mounted on the bearings of the other of the carriages and having its tool carrying portion adjacent the lower rail, a lever between said carriages, a fulcrum member for said lever clamped upon said lower rail, connecting means between each carriage and the said lever, a lever mounted upon the beam, and connections between the tracer and the tool spindle respectively and the last mentioned lever.

10. The combination with a beam, means for pivotally supporting the beam, the beam being provided with an upper and a lower guide rail, of a pair of carriages mounted upon said guide rails, each of said carriages closely engaging the lower rail at the top, bottom, front and rear and engaging the upper rail at the front and rear, each carriage being provided with upper and lower bearings, a pattern tracer mounted on the bearings of one of the carriages and having its pattern engaging portion adjacent the lower rail, a tool spindle mounted on the bearings of the other of the carriages and having its tool carrying portion adjacent the lower rail, a lever between said carriages, a fulcrum member for said lever clamped upon said lower rail, connecting means between each carriage and the said lever, a rock shaft disposed longitudinally of the beam, a longitudinally disposed wrist carried by the rock shaft, jaws carried by the tracer and engaging the said wrist for rocking the shaft upon movement of the tracer, a rock shaft in axial parallelism with said former rock shaft, connecting means between said rock shafts to cause the same to oscillate in unison, an adjustable wrist carried by the parallel rock shaft, the spindle being provided with jaws for engaging said wrist.

11. The combination with a beam and means for supporting the same for movement about a single axis, the beam being provided with ways transverse to its axis, a pattern tracer, a tool spindle, a carriage mounted on the ways and supporting the tracer for movement in a path parallel with said axis, a carriage mounted on the ways and supporting the tool spindle for movement in a path parallel with the said axis, a rock shaft mounted on the beam, connections between the tracer and said rock shaft for rocking the same upon the reciprocation of the tracer transversely of the beam, a rock shaft mounted on the tool spindle carriage and disposed in axial parallelism with the beam rock shaft, linkage connecting the rock shafts, connections between the tool spindle and rock shaft on the tool spindle carriage, and connections between said carriages for causing the same to reciprocate in unison upon the ways.

12. The combination with a beam and means for supporting the same for movement about a single axis, the beam being provided with ways transverse to its axis, a pattern tracer, a tool spindle, a carriage mounted on the ways and supporting the tracer for movement in a path parallel with said axis, a carriage mounted on the ways and supporting the tool spindle for movement in a path parallel with the said axis, a rock shaft mounted on the beam, connections between the tracer and said rock shaft for rocking the same upon the reciprocation of the tracer transversely of the beam, a rock shaft mounted on the tool spindle carriage and disposed in axial parallelism with the beam rock shaft, linkage connecting the rock shafts, the tool spindle being provided with a transversely disposed slideway, an arm on the rock shaft having a radially disposed slideway, a slide in said radially disposed slideway carrying a wrist mounted on a slide in the spindle slideway, means for clamping the slide in the radial slideway in various positions of adjustment for varying the ratio of axial movement of the spindle relative to the movement of the tracer parallel with the said beam axis, and connecting means between said carriages for causing the same to move in unison upon the beam in a measured ratio.

13. In a pantographic machine, the combination with a swinging beam, of a pattern tracer and a tool mounted thereon for reciprocation in paths parallel with the pivotal axis of the beam, and a mechanism mounted upon the beam and connecting said tracer and tool for causing these to reciprocate in paths parallel with said axis in unison in a measured ratio.

14. In a machine having a framing portion, the combination with a table supported by the framing, of a work holder and a pattern holder supported by the table, a crane, pivotal connections between the crane and framing located at positions above and below the table, a beam in the nature of a bed plate carried by the crane, the beam being provided with ways transverse to the pivotal axis of the crane, a pattern tracer, a tool spindle, a carriage mounted on the ways and supporting the tracer for movement in a path parallel with said axis, a carriage mounted on the ways and supporting the tool spindle for movement in a path parallel with the said axis, a rock shaft mounted on the beam parallel with said ways, connections between the tracer and said rock shaft for rocking the same upon the reciprocation of the tracer transversely of the ways, said connection being constructed and adapted for permitting the tracer to reciprocate on the ways without imparting motion to the said rock shaft, a rock shaft mounted on the tool spindle carriage and disposed in axial parallelism with the beam rock shaft, connections between the rock shafts for causing these to rock in unison, connections between the tool spindle and rock shaft on the tool spindle carriage for reciprocating the tool spindle transversely of the said ways, and a lever train mounted on the beam and connecting said carriages for causing these to reciprocate in unison upon the ways.

15. The combination with a bed plate provided with longitudinally disposed ways, a pattern tracer carriage and a tool spindle carriage mounted upon said ways for reciprocation thereon, a pattern tracer and a tool spindle mounted on the respective carriages for reciprocation upon such carriages transversely of the ways, an oscillatory member connected to the bed plate, each of said carriages being provided with a slideway disposed transversely of its line of reciprocation, and slides carried by said oscillatory member and mounted in said slideways respectively, a second oscillatory member mounted upon said bed plate, said pattern tracer and tool spindle each being provided with a slideway disposed transversely of its line of reciprocation upon its carriage, and slides carried by said oscillatory member and located in said slideways respectively, the organization being such that the connections between the parts moving in straight lines and the angular moving parts have a sliding connection in a direction transverse to such straight line path, and the angularly movable member in each instance transmits a straight line movement from one member to another thereby neutralizing the "crank motion" error.

16. The combination with a bed plate provided with ways, of a pair of carriages mounted upon the ways, connecting means between the carriages for effecting movement of these in a measured ratio, reciprocatory members mounted upon the carriages transversely of said ways, a rock shaft mounted upon the bed plate with its axis parallel with the ways, an elongated crank wrist carried by the rock shaft and connected with one of said members, an elongated crank wrist carried by the rock shaft for connection with the other of said members, a rock arm, a link pivoted to said rock arm and engaging said wrist member, said rock arm having a bifurcated end in which said link is seated, and means of connection between the link and an extension of the said rock arm for receiving the lateral thrust of said link while traversing said crank wrist.

17. The combination with a pattern tracer and means for supporting it for movement in two directions, one transversely to the other, of a working tool and means for supporting it for movement in two directions each transverse to the other and parallel respectively with the directions of movement of the pattern tracer, an oscillatory member, means of connection between the tracer and the oscillatory member for oscillating the latter upon movement of the tracer in one of its directions of movement, means of connection between the oscillatory member and the tool for conveying the movement to the tool corresponding to that of the tracer, a second oscillatory member, means of connection between the tracer and the said second oscillatory member for oscillating the latter upon movement of the tracer in the other of its directions, means of connection between said second oscillatory member and the tool for reciprocating the latter in the corresponding direction of its movement.

18. The combination with a pivotally supported bed plate provided with ways disposed transversely of the pivotal axis, a tool spindle carriage and a pattern tracer carriage mounted for reciprocation upon said ways, a lever, a fulcrum member secured to the bed plate, the tool spindle carriage being provided with a slideway disposed transversely of the bed plate ways, a slide disposed in said slideway and adjustably secured to said lever, a connecting bar carried by the pattern tracer carriage and guided by the ways on the bed plate and provided with a slideway disposed transversely of the bed plate ways, and a slide secured to the lever and disposed in said slideway.

19. The combination with a bed plate mounted to swing upon a vertical axis, of rails constituting upper and lower ways upon said bed plate disposed transversely of said axis, a tool spindle carriage and a pattern tracer carriage mounted for reciprocation upon said rails, a lever, a fulcrum support for said lever and means for clamping this to the lower rail upon the bed plate, said lever being provided with a longitudinally disposed guideway, a slide and means for adjusting and clamping this to said guideway, a transversely disposed slideway upon said tool spindle carriage for receiving said slide, a connecting bar mounted upon the pattern tracer carriage, means for guiding said bar upon said upper rail, said bar adjacent to the rail being provided with a transverse slideway, and a slide carried by the lever and disposed in such slideway.

20. In a pantographic machine, the combination with a swinging bed plate, of a tool spindle carriage mounted upon the bed plate for reciprocation longitudinally and transversely thereof, a pattern tracer and means for connecting the same to said spindle for reciprocating the same, said spindle being provided with a pulley, a pivoted arm, a driving pulley having its axis adjacent to and parallel with the axis of the pivot of the arm, idler pulleys mounted upon said arm, a belt passing around said driving pulley, around said idler pulleys, and around the spindle pulley, and a strut between said arm and the spindle whereby the idler pulleys will reciprocate with the spindle.

21. The combination of a beam, a pattern tracer movable endwise on the beam, a tool spindle rotatable on the beam and being also endwise movable, a shaft member rotatable on the beam, a crank-arm device connecting the shaft member with the pattern tracer for causing the shaft member to swing upon reciprocation of the tracer, a second crank device carried by the beam and connecting the tool spindle with the said shaft member whereby the reciprocations of the pattern tracer are imparted to the tool spindle in unison and in measured ratio.

22. The combination of a beam provided with ways, a carriage slidable on the ways, a pattern tracer on said carriage movable in a path perpendicular to the path of movement of the carriage, a second carriage slidable on the ways in a path parallel with the path of movement of the said carriages, a tool spindle rotatable on the second carriage on an axis perpendicular to the path of movement of the carriage and being also endwise movable, operative means carried by the beam connecting the two carriages to cause them to move in unison in measured ratio, a shaft member rotatable on the beam, a crank-arm device connecting the shaft member with the pattern tracer for causing the shaft member to swing upon reciprocation of the tracer and which movement of the shaft member by the tracer is constant for all positions of the tracer carriage in the said ways, a second crank device carried by the beam and connecting the tool spindle with the said shaft member and organized to cause a movement of the tool spindle from the shaft member that is constant for all positions of the tool spindle carriage in its said ways, whereby the reciprocations of the pattern tracer are imparted to the tool spindle in unison and in measured ratio.

23. The combination of a beam provided with ways, a carriage slidable on the ways, a pattern tracer on said carriage movable in a path perpendicular to the path of movement of the carriage, a second carriage slidable on the ways in a path parallel with the path of movement of the said carriage, a tool spindle rotatable on the second carriage on an axis perpendicular to the path of movement of the carriage and being also endwise movable, operative means carried by the beam connecting the two carriages to cause them to move in unison in measured ratio, a shaft member rotatable on the beam, a crank-arm device connecting the shaft member with the pattern tracer for causing the shaft member to swing upon reciprocation of the tracer and which movement of the shaft member by the tracer is constant for all positions of the tracer carriage in the said ways, a second crank device carried by the beam and connecting the tool spindle with the said shaft member and organized to cause a movement of the tool spindle from the shaft member that is constant for all positions of the tool spindle carriage in its said ways, whereby the reciprocations of the pattern tracer are imparted to the tool spindle in unison and in measured ratio, said tracer crank device including a crank arm that has imparted to it an angular movement that is variable relative to the reciprocation of the tracer, the second crank device including a crank member that is given an angular movement corresponding precisely with the angular movement imparted to the said crank member by the reciprocation of the pattern tracer.

24. The combination of a beam, a pattern tracer movable endwise on the beam, a tool spindle rotatable on the beam and being also endwise movable, a shaft member rotatable on the beam, a crank-arm device connecting the shaft member with the pattern tracer for causing the shaft member to swing upon reciprocation of the tracer, a second crank device carried by the beam and connecting the tool spindle with the said shaft member, said tracer crank device including a crank member that is given an angular movement corresponding precisely with the angular movement imparted to the said crank member by the reciprocation of the pattern tracer, the latter crank device being connected with the tool spindle to reproduce in the tool spindle the same variation of movement between the tracer and its said crank device, as said variation between the tracer and its crank device but in a measured ratio, whereby the reciprocations of the pattern tracer are imparted to the tool spindle in unison and in exact measured ratio.

25. The combination of a beam provided with ways, a carriage slidable on the ways, a pattern tracer on said carriage movable in a path perpendicular to the path of movement of the carriage, a second carriage slidable on the ways in a path parallel with the path of movement of the said carriage, a tool spindle rotatable on the second carriage on an axis perpendicular to the path of movement of the carriage and being also endwise movable, operative means carried by the beam connecting the two carriages to cause them to move in unison in measured ratio, a shaft member rotatable on the beam, a crank-arm device connecting the shaft member with the pattern tracer for causing the shaft member to swing upon reciprocation of the tracer and which movement of the shaft member by the tracer is constant for all positions of the tracer carriage in the said ways, a second crank device carried by the beam and connecting the tool spindle by the beam and connecting the tool spindle with the said shaft member and organized to cause a movement of the tool spindle from the shaft member that is constant for all positions of the tool spindle carriage in all said ways, said tracer crank device including a crank arm that has imparted to it from the tracer an angular movement that is variable relative to the reciprocation of the tracer, the second crank device including a crank member that is given an angular movement corresponding precisely with the angular movement imparted to the said crank member by the reciprocation of the pattern tracer, the latter crank device being connected with the tool spindle to reproduce in the tool spindle the same variation of movement between the tracer and its said crank device, as said variation between the tracer and its crank device but in a measured ratio, whereby the reciprocations of the pattern tracer are imparted to the tool spindle in unison and in exact measured ratio.

26. The combination of a beam, a pattern tracer movable endwise on the beam, a tool spindle rotatable on the beam and being also endwise movable, a shaft member rotatable on the beam, a crank-arm device connecting the shaft member with the pattern tracer for causing the shaft member to swing upon reciprocation of the tracer, a second crank device carried by the beam and connecting the tool spindle with the said shaft member whereby the reciprocations of the pattern tracer are imparted to the tool spindle in unison and in measured ratio, and a frame on which the beam is mounted to swing on an axis parallel with the axis of the tool spindle.

27. The combination of a beam provided with ways, a carriage slidable on the ways, a pattern tracer on said carriage movable in a path perpendicular to the path of movement of the carriage, a second carriage slidable on the ways in a path parallel with the path of movement of the said carriages, a tool spindle rotatable on the second carriage on an axis perpendicular to the path of movement of the carriage and being also endwise movable, operative means carried by the beam connecting the two carriages to cause them to move in unison in measured ratio, a shaft member rotatable on the beam, a crank-arm device connecting the shaft member with the pattern tracer for causing the shaft member to swing upon reciprocation of the tracer and which movement of the shaft member by the tracer is constant for all positions of the tracer carriage in the said ways, a second crank device carried by the beam and connecting the tool spindle with the said shaft member and organized to cause a movement of the tool spindle from the shaft member that is constant for all positions of the tool spindle carriage in its said ways, whereby the reciprocations of the pattern tracer are imparted to the tool spindle in unison and in measured ratio, and a frame on which the beam is mounted to swing on an axis parallel with the axis of the tool spindle.

28. The combination of a beam provided with ways, a carriage slidable on the ways, a pattern tracer on said carriage movable in a path perpendicular to the path of movement of the carriage, a second carriage slidable on the ways in a path parallel with the path of movement of the said carriage, a tool spindle rotatable on the second carriage on an axis perpendicular to the path of movement of the carriage and being also endwise movable, operative means carried by the beam connecting the two carriages to cause them to move in unison in measured ratio, a shaft member rotatable on the beam, a crank-arm device connecting the shaft member with the pattern tracer for causing the shaft member to swing upon reciprocation of the tracer and which movement of the shaft member by the tracer is constant for all positions of the tracer carriage in the said ways, a second crank device carried by the beam and connecting the tool spindle with the said shaft member and organized to cause a movement of the tool spindle from the shaft member that is constant for all positions of the tool spindle carriage in its said ways, whereby the reciprocations of the pattern tracer are imparted to the tool spindle in unison and in measured ratio, said tracer crank device including a crank arm that has imparted to it an angular movement that is variable relative to the reciprocation of the tracer, the second crank device including a crank member that is given an angular movement corresponding precisely with the angular movement imparted to the said crank member by the reciprocation of the pattern tracer, and a frame on which the beam is mounted to swing on an axis parallel with the axis of the tool spindle.

FRANCIS H. RICHARDS.

Witnesses:
CHAS. LYON RUSSELL,
FRED. J. DOLE.

Copies of this patent may be obtained for five cents each, by addressing the " Commissioner of Patents, Washington, D. C."